(12) United States Patent
Goodsitt et al.

(10) Patent No.: US 10,523,628 B2
(45) Date of Patent: Dec. 31, 2019

(54) ROUTING FOR LARGE SERVER DEPLOYMENTS

(71) Applicant: Capital One Services, LLC, McLean, VA (US)

(72) Inventors: Jeremy Goodsitt, Champaign, IL (US); Austin Walters, Savoy, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/196,204

(22) Filed: Nov. 20, 2018

(65) Prior Publication Data

US 2019/0253379 A1 Aug. 15, 2019

Related U.S. Application Data

(63) Continuation of application No. 15/892,795, filed on Feb. 9, 2018, now Pat. No. 10,230,683.

(51) Int. Cl.
*H04L 29/12* (2006.01)
*H04L 29/08* (2006.01)

(52) U.S. Cl.
CPC ............ *H04L 61/10* (2013.01); *H04L 61/304* (2013.01); *H04L 67/1002* (2013.01); *H04L 67/1006* (2013.01); *H04L 67/02* (2013.01)

(58) Field of Classification Search
CPC .................................................. H04L 61/10
See application file for complete search history.

(56) References Cited

U.S. PATENT DOCUMENTS

| | | | |
|---|---|---|---|
| 6,779,039 B1 * | 8/2004 | Bommareddy | ... H04L 29/12009 709/226 |
| 8,165,122 B2 | 4/2012 | Kotalwar et al. | |
| 9,253,245 B2 | 2/2016 | Wood et al. | |
| 9,294,408 B1 * | 3/2016 | Dickinson | ............... H04L 47/70 |
| 10,230,683 B1 * | 3/2019 | Goodsitt | ............... H04L 61/304 |
| 2005/0005006 A1 | 1/2005 | Chauffour et al. | |

(Continued)

OTHER PUBLICATIONS

A10 Networks, Inc., "Application Delivery and Server Load Balancing Guide," https://nettools.net.berkeley.edu/tools/docs/a10/thunder/ACOS_4_1_0/html/slb-Responsive%20HTML5/slb/ACOS_Performance_Optimization/slb-perf-stateless-slb/slb-perf-stateless-slb.htm?rhtocid=8.1.1, retrieved on Jan. 8, 2018, 3 pages.

(Continued)

*Primary Examiner* — Jimmy H Tran
(74) *Attorney, Agent, or Firm* — DLA Piper LLP (US)

(57) ABSTRACT

In one aspect, the present disclosure relates to a method comprising: receiving, at a client device, information from a node manager about a plurality of nodes in a computer cluster, the information comprising a network address associated each of the plurality of nodes and sending, by the client device, a request to a load balancer to access a first node from the plurality of nodes, the request comprising a first URL including an encoded representation of the network address associated with the first node. The load balancer is configured to determine the request should be routed to a first network address based on decoding the URL, the first network address associated with a first node from the plurality of nodes and forward the request to the first node in response to the determining.

9 Claims, 3 Drawing Sheets

(56) References Cited

U.S. PATENT DOCUMENTS

| | | |
|---|---|---|
| 2005/0076145 A1 | 4/2005 | Ben-Zvi et al. |
| 2005/0246393 A1 | 11/2005 | Coates et al. |
| 2005/0257264 A1 | 11/2005 | Stolfo et al. |
| 2007/0140262 A1* | 6/2007 | Wang ............... H04L 29/06027 370/395.52 |
| 2007/0168560 A1* | 7/2007 | Alkire ............... H04L 29/12009 709/247 |
| 2008/0031249 A1 | 2/2008 | Valtchev et al. |
| 2008/0140841 A1* | 6/2008 | Ott ...................... H04L 63/166 709/226 |
| 2008/0209070 A1 | 8/2008 | Horn |
| 2008/0243634 A1 | 10/2008 | Dworkin et al. |
| 2009/0144444 A1* | 6/2009 | Chauffour ............ H04L 29/06 709/238 |
| 2009/0235067 A1 | 9/2009 | Miller et al. |
| 2009/0248786 A1 | 10/2009 | Richardson et al. |
| 2010/0191776 A1* | 7/2010 | McDonald ........... G06F 16/137 707/802 |
| 2011/0153827 A1 | 6/2011 | Yengalasetti et al. |
| 2011/0153831 A1 | 6/2011 | Mutnuru et al. |
| 2013/0007225 A1* | 1/2013 | Gage ..................... H04L 29/06 709/219 |
| 2014/0215059 A1 | 7/2014 | Astiz Lezaun et al. |
| 2015/0003237 A1 | 1/2015 | Guerra et al. |
| 2015/0019353 A1 | 1/2015 | Warrum et al. |
| 2015/0358171 A1* | 12/2015 | Rosenberg ......... H04L 12/1822 709/204 |
| 2015/0358472 A1* | 12/2015 | Rosenberg ............. G06F 16/95 370/235 |
| 2016/0316006 A1* | 10/2016 | Zhang ................. H04L 61/1511 |
| 2016/0337264 A1* | 11/2016 | Murashko, IV ...... H04L 47/827 |
| 2016/0342645 A1 | 11/2016 | Tempero et al. |
| 2016/0359961 A1* | 12/2016 | Cooney ............... H04L 67/1008 |
| 2017/0346789 A1 | 11/2017 | Maslak |
| 2017/0353516 A1 | 12/2017 | Gordon |
| 2017/0359344 A1 | 12/2017 | Kaal et al. |
| 2017/0374015 A1 | 12/2017 | Siba et al. |
| 2018/0013809 A1* | 1/2018 | Gordon ............ H04N 21/23439 |
| 2018/0013810 A1 | 1/2018 | Gordon |
| 2018/0063229 A1 | 3/2018 | Glover et al. |
| 2019/0037252 A1* | 1/2019 | Wagenaar ........ H04N 21/23106 |

OTHER PUBLICATIONS

Zhao, et al., "Tapestry: A resilient global-scale overlay for service deployment", IEEE Journal on selected areas in communications 22.1, Jan. 1, 2004, 41-53 pages.

Jain, et al., B4: Experience with a globally-deployed software defined WAN, ACM SIGCOMM Computer Communication Review, vol. 43 No. 4, ACM, Aug. 12-16, 2013.

Greenberg, et al., "VL2: a scalable and flexible data center network", ACM SIGCOMM Computer communication review, vol. 39 No. 4, ACM, Aug. 17-21, 2009.

* cited by examiner

ROUTING FOR LARGE SERVER DEPLOYMENTS

CROSS-REFERENCE TO RELATED APPLICATIONS

This is a continuation of U.S. application Ser. No. 15/892,795, filed Feb. 9, 2018, the content of which is herein incorporated by reference in its entirety.

BACKGROUND

As is known in the art, a computer cluster is a set of loosely or tightly connected computers that work together so that, in many respects, they can be viewed as a single system. Clusters with hundreds of computers (or "nodes") may be used to perform complex distributed processing tasks such as deep neural network (DNN) machine learning. Clusters may be deployed to improve performance and availability while typically being much more cost-effective than single computers of comparable speed or availability. Cloud-based computing environments make it possible to allocate large clusters programmatically using Application Programming Interfaces (APIs) through which an administrator can instantiate and configure virtual machines (or "instances") as desired or necessary.

As is also known in the art, cloud-based clusters and other large server deployments may utilize load balancers to distribute network traffic across physical and/or virtual servers. A load balancer may be provided as a software program that listens on a network port where external clients connect. The load balancer may forward client requests to one of the "backend" servers, which processes the request and send a response back to the load balancer. Some load balancers may include routing capabilities. For example, existing load balancers may be configured to route certain types of requests to specific backend servers.

Traditionally, load balancers have had to maintain state information about the backend servers. For example, some existing load balancers maintain a lookup-table or prioritized list of backend servers. Processing a single request may involve iterating through long lists of rules in order to determine where to route the request. Moreover, before client requests can be routed to a particular backend server, the server must be registered with the load balancer. In cloud-based systems where the allocation of backend servers can change frequently, the load balancer must be updated often and can require complex rules to ensure proper routing of traffic. These problems are compounded when multiple load balancers are employed for redundancy or scalability.

SUMMARY

According to one aspect, the present disclosure relates to a method including: receiving a first request from a client device; generating a plurality of uniform resource locators (URLs), each of the plurality of URLs including an encoded representation of a network address associated with a respective node from a plurality of nodes in a computer cluster; sending a first response to a client device, the first response including the plurality of URLs; receiving a second request from the client device, the second request including a first URL from the plurality of URLs; determining the second request should be routed to a first network address based on decoding the first URL, the first network address associated with a first node from the plurality of nodes; and forwarding the second request to the first node in response to the determining.

In some embodiments, each of the plurality of URLs includes a hash of an Internet Protocol (IP) address associated with a respective node from the plurality of nodes. In certain embodiments, generating the plurality of URLs includes generating a web page including the plurality of URLs in response to receiving the request from the client device. In other embodiments, the method includes receiving a second response from the first node an forwarding the second response to the client device. In some embodiments, receiving the first request from the client device includes receiving the first request at a cluster node manager. In certain embodiments, receiving the second request from the client device includes receiving the second request at a cluster load balancer. In other embodiments, each of the plurality of URLs includes an encoded representation of a network address within the subdomain portion of the URL. In some embodiments, each of the plurality of URLs includes an encoded representation of a network address within the path portion of the URL.

According to another aspect, the present disclosure relates to a method including: sending a first request to a cluster load manager; receiving a first response including from the cluster node manager, the first response including a plurality of uniform resource locators (URLs), each of the plurality of URLs including an encoded representation of a network address associated with a respective node from a plurality of nodes in a computer cluster; sending a second request to a cluster load balancer, the second request including a first URL from the plurality of URLs. The cluster load balancer may be configured to: determine the second request should be routed to a first network address based on decoding the first URL, the first network address associated with a first node from the plurality of nodes; and forward the second request to the first node in response to the determining.

In some embodiments, the method includes receiving a second response from the cluster load balancer, the second response generated by the first node in response to receiving the second request forwarded by the cluster load balancer. In certain embodiments, each of the plurality of URLs includes a hash of an Internet Protocol (IP) address associated with a respective node from the plurality of nodes. In some embodiments, sending the first request to the cluster load manager includes sending a request to an Hypertext Transfer Protocol (HTTP) server. In some embodiments, each of the plurality of URLs includes an encoded representation of a network address within the subdomain portion of the URL. In certain embodiments, each of the plurality of URLs includes an encoded representation of a network address within the path portion of the URL.

According to yet another aspect, the present disclosure relates to a system including: a processor; a volatile memory; and a non-volatile memory storing computer program code. When executed on the processor, the computer program code causes the processor to execute a process operable to: receive a first request from a client device; generate a plurality of uniform resource locators (URLs), each of the plurality of URLs including an encoded representation of a network address associated with a respective node from a plurality of nodes in a computer cluster; send a first response to the client device, the first response including the plurality of URLs to a client device; receive a second request from the client device, the second request including a first URL from the plurality of URLs; determine the second request should be routed to a first network address based on decoding the first URL, the first network address associated with a first node from the plurality of nodes; and forward the second request to the first node in response to the determining.

In some embodiments, each of the plurality of URLs includes a hash of an Internet Protocol (IP) address associated with a respective node from the plurality of nodes. In certain embodiments, generating the plurality of URLs includes generating a web page including the plurality of URLs in response to receiving the request from the client device. In particular embodiments, the process is operable to receive a second response from the first node and forward the second response to the client device. In some embodiments, receiving the first request from the client device includes receiving the first request at a cluster node manager. In certain embodiments, receiving the second request from the client device includes receiving the second request at a cluster load balancer.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings.

The drawings are not necessarily to scale, or inclusive of all elements of a system, emphasis instead generally being placed upon illustrating the concepts, structures, and techniques sought to be protected herein.

DETAILED DESCRIPTION

According to various embodiments of the present disclosure, a load balancer may route network traffic to particular backend servers using network address information encoded within incoming requests. An incoming request may include the network address of a backend server encoded within a Uniform Resource Locator (URL), for example within the subdomain or path portion of the URL. The load balancer may decode the network address from the subdomain/path portion of the URL, and then forward the request to the server at that address. Using this approach, the load balancer may be able to route traffic to a large number of backend servers without having to maintain state information about those servers.

Figure 1:
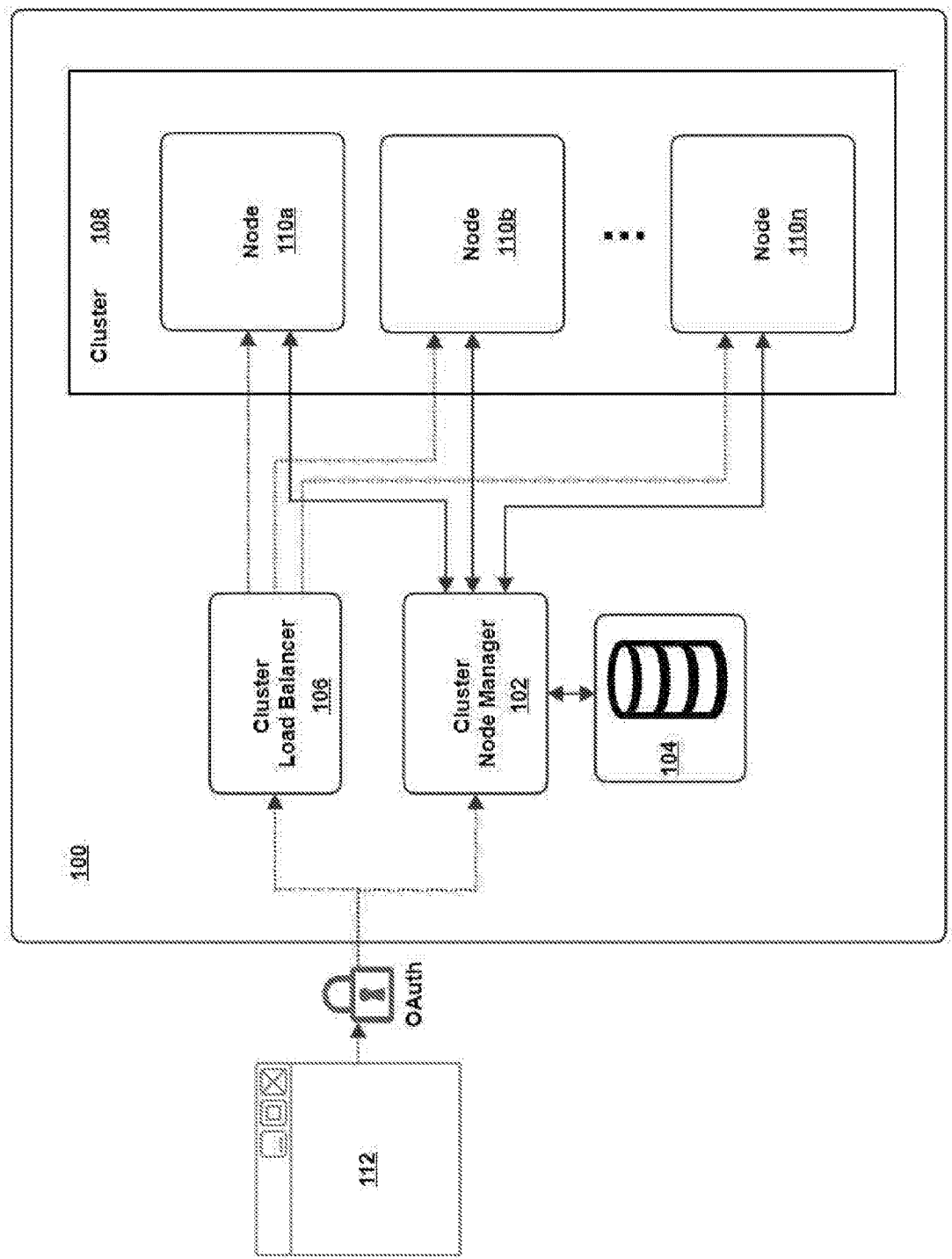
FIG. 1 is a diagram of a cluster computing system, according to some embodiments of the present disclosure.

FIG. 1 illustrates a cluster computing system 100, according to an embodiment of the present disclosure. The system 100 includes a cluster node manager 102, a database 104, a cluster load balancer 106, and a computer cluster 108. Users can interact with the system 100 using one or more client devices 112, such as a desktop, laptop, tablet, or mobile computing device. In some embodiments, users can interact with the system 100 using a web browser executing on the client device 112. The various components of the system 100 and client devices 112 may be connected as illustrated in FIG. 1 or in any other suitable manner. The illustrated components may be connected by one or more wireless or wireline computer networks.

In the embodiment of FIG. 1, the computer cluster (or "cluster") 108 includes one or more nodes 110a, 110b, . . . , 110n (110 generally). Each node 110 may correspond to a physical or virtual computer. In some embodiments, all of the nodes 110 have substantially the same hardware and/or software configuration. For example, each node 110 may comprise a Hypertext Transfer Protocol (HTTP) server and a copy of application software responsive to HTTP requests received by the HTTP server.

In particular embodiments, the system 100 may be used for machine intelligence (MI) tasks. In such embodiments, each node 110 may comprise an HTTP server, visualization tools, and an MI processor (none of which are shown in FIG. 1). The MI processor may comprise TENSORFLOW™, an open-source software library for MI, and the visualization tools may comprise TENSORBOARD™, an open-source tool to visualize neural network models (or other MI models) defined as "graphs" within a TENSORFLOW™ application. In other embodiments, the visualization tools and/or MI processor may utilize other open-source or proprietary MI software libraries known to one of ordinary skill in the art. In certain embodiments, the visualization tools may include a web-based graphical user interface, and a client device 112 can connect to the HTTP server of a particular node 110 in order to access the node's visualization tools.

Referring again to the embodiment of FIG. 1, the cluster node manager (or "node manager") 102 may be configured to manage nodes within the cluster 108. For example, the node manager 102 may instantiate and de-instantiate nodes 110 based on system load or other criteria. In particular embodiments, the node manager 102 may allocate nodes 110 based on load information obtained from individual nodes 110 and use this load information to dynamically adjust the number of nodes 110. In particular embodiments, the load information may include one or more metrics associated with the training of a MI model, such as a deep neural network model.

In some embodiments, the cluster computing system 100 may be hosted within a cloud computing environment. In such embodiments, the node manager 102 may instantiate and de-instantiate nodes 110 using an Application Programming Interface (API) provided by the cloud computing environment.

Referring to the embodiment of FIG. 1, the node manager 102 may maintain information about the state of the cluster 108. In some embodiments, the node manager 102 maintains a lookup table including a network address for each allocated node 110. In certain embodiments, the network addresses are Internet Protocol (IP) addresses. In some embodiments, the IP addresses are internal to the system 100, meaning that client devices 112 cannot directly connect to the nodes 110 using those IP addresses. Instead, the client devices 112 may connect to the nodes indirectly through the cluster load balancer 106. In certain embodiments, the node manager 102 stores state information within the database 104.

Referring again to the embodiment of FIG. 1, the node manager 102 may include an HTTP server or other type of server that can process requests from the client device 112. In some embodiments, the client device 112 can request, from the node manager 102, information about nodes 110 currently allocated within the cluster 108. In certain embodiments, the node manager 102 may generate a Uniform Resource Locator (URLs) for each node 110 in the cluster and return a list of node URLs to the client device 112. In some embodiments, the node manager 102 may return the list of URLs as a web page which is rendered in a web browser of the client device 112. In some embodiments, the URL generated for a particular node 110 may include an encoded representation of that node's network address within the system 110. For example, assuming a first node 110a has IP address 10.0.1.1, the URL generated for node 110a may include an encoded representation of this address within the subdomain portion of the URL as shown here:

http://inst-0a000101.example-url.com

As another example, the node's address may be encoded with the path portion of the URL, as shown here:

http://example-url.com/inst-0a000101/

In particular embodiments, the node's network address may be encoded using hexadecimal encoding. In some embodiments, the network address may be encrypted within the URL to avoid exposing network address information outside of the system 100 and/or to prevent URL tampering.

In some embodiments, the cluster load balancer 106 manages network traffic between the client devices 112 and the cluster nodes 110. In particular, the cluster load balancer 106 may receive a request from a client device 112, determine which cluster node 110 should handle the request, and then forward the client request to that node 110. In turn, the node 110 may process the client request, return a response to the cluster load balancer 106, and the cluster load balancer 106 may forward the response to the client device.

In some embodiments, cluster load balancer 106 may be configured to route client requests to particular nodes 110 specified by the request. For example, a client request may include a URL having an encoded representation of a node's network address. The URL may correspond to a URL generated by the cluster node manager 102 and provided to the client device 112, as described above. In such embodiments, the cluster load balancer 106 may be configured to decode the URL to determine the node's network address (e.g., IP address) and then forward the client request to the node using the decoded address. For example, if the client request includes the following URL:

http://inst-0a000101.example-url.com the cluster load balancer 106 may decode this URL to determine node address 10.0.1.1 and then forward the client request to that address.

Whereas traditional load balancers may need to keep track of each backend server, the cluster load balancer 106 can route client requests to particular nodes 110 without having to maintain any information about the nodes. Moreover, unlike existing load balancers, the techniques described herein do not require iterating through rules lists or using lookup tables and, thus, scale to an arbitrary number of nodes 110 without affecting the processing or storage requirements within the load balancer 106.

In one embodiment, the cluster load balancer 106 utilizes a NGINX™, an open source web server and load balancer, along with OpenResty® to route network traffic to the cluster nodes 110.

Figure 2:
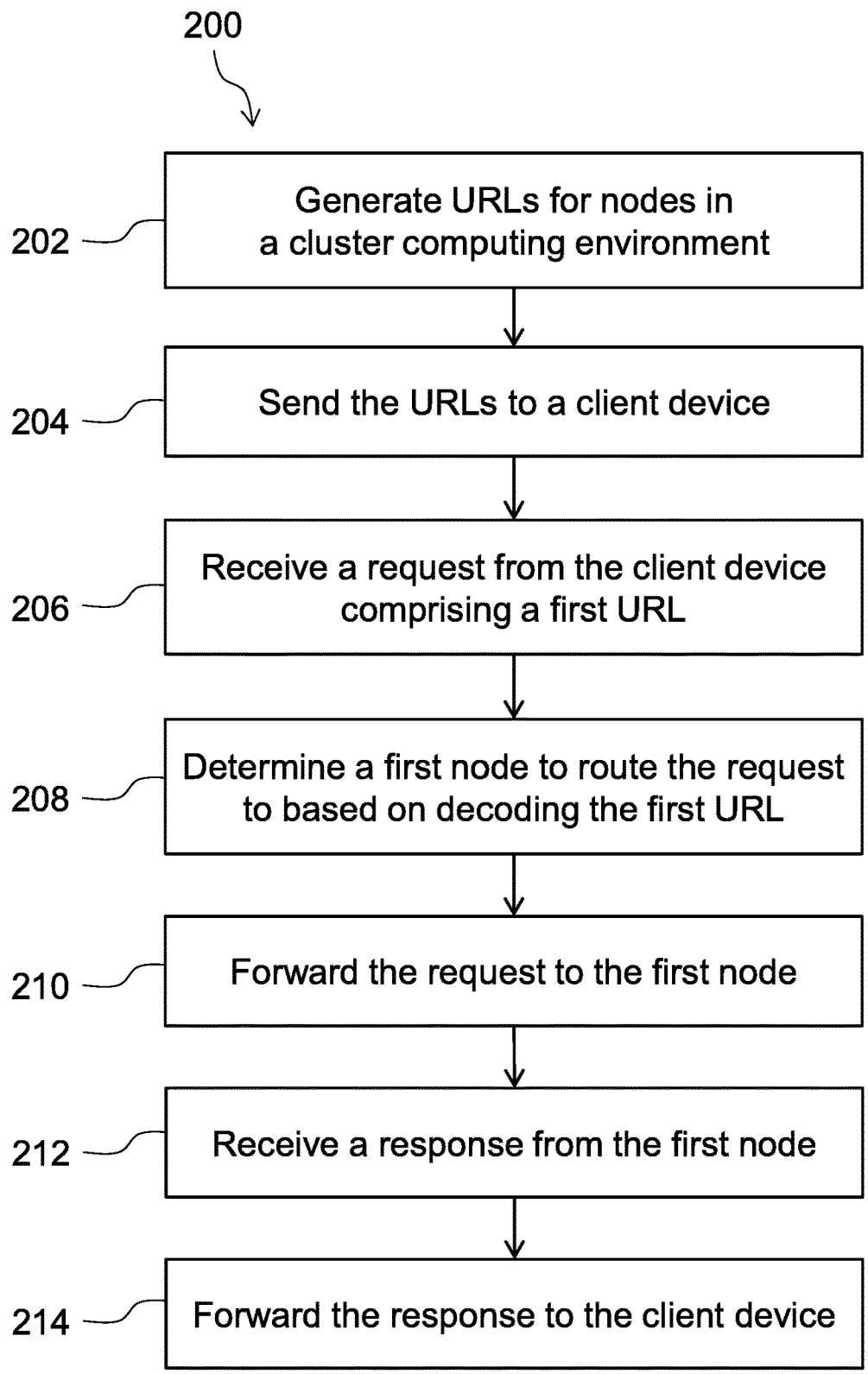
FIG. 2 is a flow diagram showing processing that may occur within the system of FIG. 1, according to some embodiments of the present disclosure.

Referring to FIG. 2, a method 200 can be used for stateless routing in a cluster computing system, according to an embodiment of the present disclosure. At block 202, a URL may be generated for each node in a computer cluster (e.g., each node 110 in cluster 108 of FIG. 1). Each URL may include an encoded representation of the network address for the corresponding node. In some embodiments, the URLs have a format similar to one of the URL formats described above in conjunction with FIG. 1. At block 204, the URLs may be sent to a client device, such as client device 112 of FIG. 1. In certain embodiments, blocks 202 and 204 may be performed by a cluster node manager (e.g., cluster node manager 102 of FIG. 1). In some embodiments, the URLs are sent to the client device as a web page.

At block 206, a request is received from a client device, the request including a first URL. The first URL includes an encoded representation of a network address of a first node of the cluster (e.g., node 110a in FIG. 1). The first URL may be one of the URLs generated and sent to the client at blocks 202 and 204. At block 208, the first URL is decoded to obtain the network address of the first node. At block 210, the request is forwarded to the first node using the decoded network address. At block 212, a response is received from the first node, e.g., after the first node has completed processing of the request. At block 214, the response is forwarded to the client device. In some embodiments, blocks 206-214 may be performed by a cluster load balancer (e.g., cluster load balancer 106 of FIG. 1).

Figure 3:
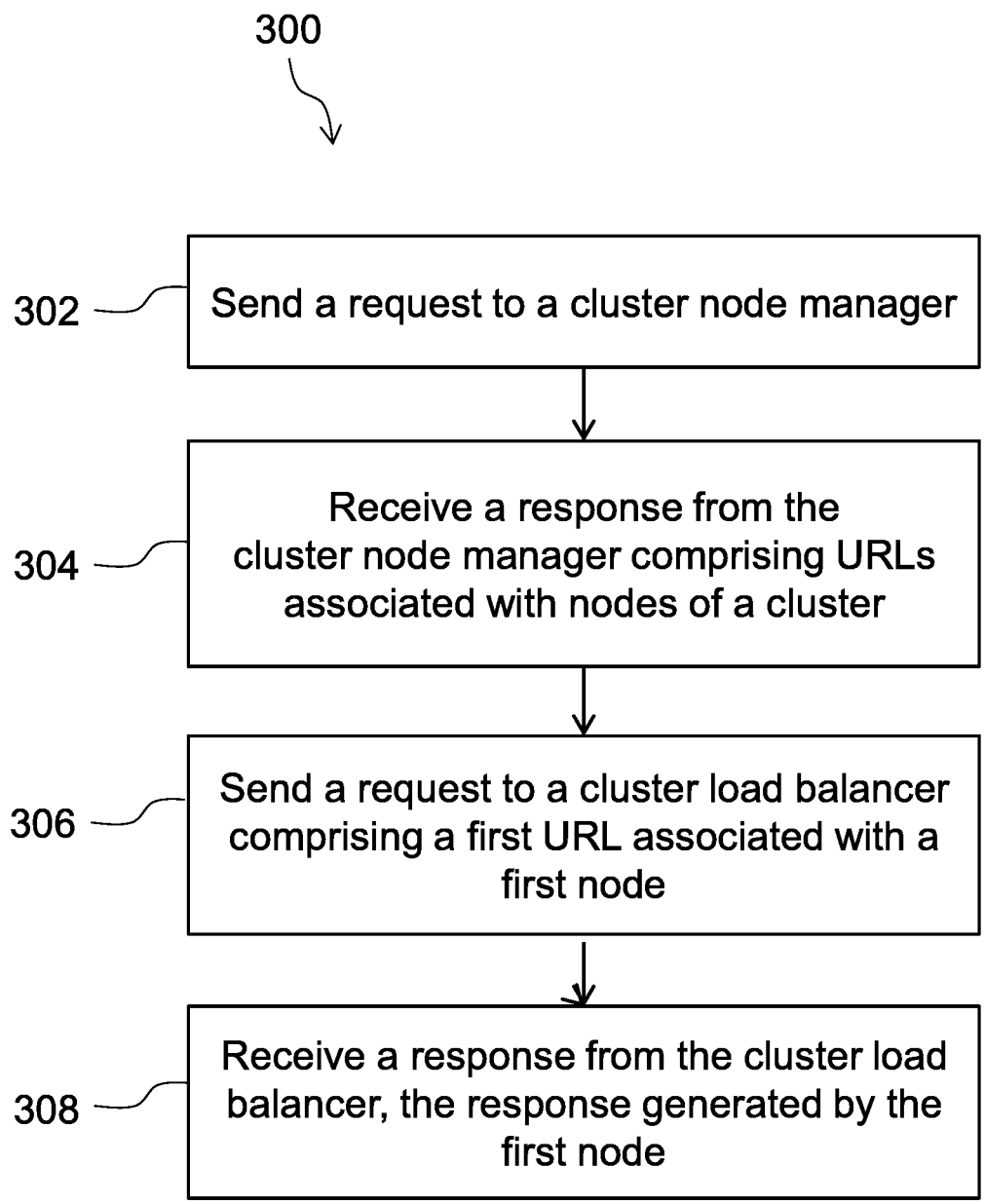
FIG. 3 is another flow diagram showing processing that may occur within the system of FIG. 1, according to some embodiments of the present disclosure.

Referring to FIG. 3, a method 300 may be performed by a client device (e.g., client device 112 of FIG. 1) to send a request to particular node within a computer cluster (e.g., node 110a in cluster 108 of FIG. 1), according to an embodiment of the present disclosure. At block 302, a request is sent to a cluster node manager (e.g., cluster node manager 102 of FIG. 1). At block 304, the cluster node manager responds with a list of URLs, each URL is associated with a node of the cluster and includes an encoded representation of that node's network address. In particular embodiments, the URLs have a format similar to one of the URL formats described above in conjunction with FIG. 1. In some embodiments, the cluster node manager responses with a web page including the list of URLs.

At block 306, a request is sent to a cluster load balancer (e.g., cluster load balancer 106 of FIG. 1), the request including a first URL associated with the first node. In some embodiments, the cluster load balancer is configured to decode the first URL to obtain the first node's network address and then forward the request to the first node using the decoded network address. At block 308, a response is received from the cluster load balancer, the response being generated by the first node. In some embodiments, the cluster load balancer is configured to forward the response from the first node to the client device.

Although embodiments of the present disclosure have been described for use with cluster computing systems, the concepts sought to be protected herein can be utilized in any multi-server computing system.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method comprising:
receiving, at a client device, information from a node manager about a plurality of nodes in a computer cluster, the information comprising a network address associated each of the plurality of nodes; and
sending, by the client device, a request to a load balancer to access a first node from the plurality of nodes, the request comprising a first URL including an encoded representation of the network address associated with the first node, wherein the load balancer is configured to:
  determine the request should be routed to a first network address based on decoding the URL, the first network address associated with a first node from the plurality of nodes; and
  forward the request to the first node in response to the determining.

2. The method of claim 1 wherein the first URL comprises an encoded representation of an Internet Protocol (IP) address associated with the first node.

3. The method of claim 2 wherein the first URL comprises a hash of the IP address associated with the first node.

4. The method of claim 1 where the first URL comprises an encoded representation of the network address associated with the first node within the subdomain portion of the first URL.

5. The method of claim 1 where the first URL comprises an encoded representation of the network address associated with the first node within the path portion of the first URL.

6. The method of claim 1 comprising:
receiving, by the client device, a response from the load balancer, the response comprising a response received from the first node.

7. The method of claim 1 wherein the node manager is a cluster node manager.

8. The method of claim 1 wherein the load balancer is a cluster load balancer.

9. A system comprising:
a processor; and
a non-volatile memory storing computer program code that when executed on the processor causes the processor to execute a process operable to:
  receive, from a node manager, information about a plurality of nodes in a computer cluster, the information comprising a network address associated each of the plurality of nodes; and
  send, to a load balancer, a request to access a first node from the plurality of nodes, the request comprising a first URL including an encoded representation of the network address associated with the first node, wherein the load balancer is configured to:
    determine the request should be routed to a first network address based on decoding the URL, the first network address associated with a first node from the plurality of nodes; and
    forward the request to the first node in response to the determining.

* * * * *